United States Patent [19]

Mills

[11] 3,925,220
[45] Dec. 9, 1975

[54] PROCESS OF COMPRISING SOLVENT EXTRACTION OF A BLENDED OIL

[75] Inventor: Ivor W. Mills, Media, Pa.

[73] Assignee: Sun Oil Company of Pennsylvania, Philadelphia, Pa.

[22] Filed: Aug. 15, 1972

[21] Appl. No.: 280,919

[52] U.S. Cl. .................. 252/63; 208/14; 252/64
[51] Int. Cl.² ........................................ H01B 3/00
[58] Field of Search ............... 208/14; 252/63, 64

[56] References Cited
UNITED STATES PATENTS

| | | | |
|---|---|---|---|
| 3,000,807 | 9/1961 | Wasson et al. | 208/14 |
| 3,192,153 | 6/1965 | Smilski | 208/264 |
| 3,419,497 | 12/1968 | Rocchini | 252/63 |

FOREIGN PATENTS OR APPLICATIONS

| 743,525 | 9/1966 | Canada | 208/14 |
|---|---|---|---|

Primary Examiner—John D. Welsh
Attorney, Agent, or Firm—George L. Church; J. Edward Hess; Barry A. Bisson

[57] ABSTRACT

A petroleum oil of improved stability (e.g., as an electrical insulation medium), can be prepared by a process comprising blending 25–98 parts (preferably 50–95) of a severely hydrorefined oil [preferably, a hydrorefined naphthenic or mildly aromatic oil having a VGC from 0.820–0.940, a viscosity from 30 to 200 SUS at 100°F. and an ultraviolet absorptivity (UVA) of less than 0.04 in the 335 millimicron region (i.e., 335 UVA)] with from 75–2 parts (preferably 50–5) by weight of unhydrogenated naphthenic distillate (which preferably is free of naphthenic acids, and more preferred, has a pour point less than 0°F.), and then extracting the blend with an aromatic selective solvent (e.g., furfural, phenol) to obtain a raffinate oil product. The raffinate can be finished, as by adsorbent contact with attapulgite, acid activated clay or mixtures of such adsorbents. From 0.1–30 weight percent of a cycle oil can be added to the blend before extraction or to the raffinate oil product.

15 Claims, No Drawings

PROCESS OF COMPRISING SOLVENT EXTRACTION OF A BLENDED OIL

CROSS REFERENCE TO RELATED APPLICATIONS

The present application is related to all of the following, earlier filed, applications:

| Serial No. | Filing Date | Patent No. | Issue Date | Title |
|---|---|---|---|---|
| 622,398 | 3-13-67 | 3,462,358 | 8-19-69 | Clay Treatment of Hydrorefined Cable Oils - IVOR W. MILLS & GLENN R. DIMELER |
| 636,493 | 5-5-67 | 3,681,279 | 8-1-72 | Process for Preparing an Aromatic Oil and Non-discoloring Rubber Composition Containing Said Oil - IVOR W. MILLS, GLENN R. DIMELER & MERRITT C. KIRK, JR. |
| 652,026 | 7-10-67 | 3,502,567 | 3-24-70 | Process for Producing Cable Oils by Sequential Refining Steps - IVOR W. MILLS & GLENN R. DIMELER |
| 730,999 | 5-22-68 | 3,839,188 | 10-1-74 | Hydrorefined Transformer Oil and Process of Manufacture - IVOR W. MILLS & GLENN R. DIMELER |
| 792,131 | 1-17-69 | 3,699,071 | 10-17-72 | High Modulus Composition Comprising Hydrocarbon Oil, Rubber and Carbon Black - IVOR W. MILLS, GLENN R. DIMELER, MERRITT C. KIRK, JR. & JACKSON S. BOYER |
| 812,516 | 2-19-69 | 3,619,414 | 11-9-71 | Catalytic Hydrofinishing of Petroleum Distillates in the Lubricating Oil Boiling Range - IVOR W. MILLS, MERRITT C. KIRK, JR. & ALBERT T. OLENZAK |
| 828,746 | 5-28-69 | 3,658,689 | 4-25-72 | Isomerization of Waxy Lube Streams and Waxes - IB STEINMETZ & DAVID S. BARMBY |
| 850,716 | 8-18-69 | now abandoned | | Blended Hydrocarbon Oil and Process of Manufacture - IVOR W. MILLS & GLENN R. DIMELER |
| 850,717 | 8-18-69 | now abandoned | | Hydrorefined Lube Oil and Process of Manufacture - IVOR W. MILLS & GLENN R. DIMELER |
| 850,778 | 8-18-69 | 3,654,127 | 4-4-72 | Process for Preparing High Viscosity Hydrorefined Cable Oil - IVOR W. MILLS, GLENN R. DIMELER, WILLIAM A. ATKINSON & JAMES P. HOFFMAN |
| 850,779 | 8-18-69 | 3,586,752 | 6-22-71 | Electrical Conduit Containing Hydrorefined Oil - IVOR W. MILLS, GLENN R. DIMELER & JOHN J. MELCHIORE |
| 873,008 | 10-31-69 | now abandoned | | Oil and Process of Manufacture of Blended Hydrorefined Oil - IVOR W. MILLS & GLENN R. DIMELER |
| 874,087 | 10-27-69 | 3,706,653 | 12-19-72 | Light-colored Highly Aromatic Oil and Process of Preparation - IVOR W. MILLS, GLENN R. DIMELER & MERRITT C. KIRK, JR. |
| 22,295 | 3-24-70 | 3,681,233 | 8-1-72 | Hydrorefined Cable Oil and Process of Manufacture - IVOR W. MILLS & GLENN R. DIMELER |
| 35,231 | 5-6-70 | now abandoned | | Hydraulic Oil Composition Containing a Blended Base Stock - JOHN Q. GRIFFITH, III, EDWARD S. WILLIAMS, WILLIAM H. REILAND, JR., IVOR W. MILLS & GLENN R. DIMELER |
| 60,642 | 8-3-70 | now abandoned | | Textile Machinery Lubricant Composition - JAMES R. AMAROSO & JOHN Q. GRIFFITH, III |

| Serial No. | Filing Date | Patent No. | Issue Date | Title |
|---|---|---|---|---|
| | | -continued | | |
| 70,590 | 9-8-70 | 3,732,154 | 5-8-73 | Catalytic Hydrofinishing of Lube Oil Product of Solvent Extraction of Petroleum Distillate - IVOR W. MILLS, MERRITT C. KIRK, JR. & ALBERT T. OLENZAK |
| 165,006 | 7-22-71 | 3,804,743 | 4-16-74 | Process for Producing Blended Petroleum Oils - IVOR W. MILLS & GLENN R. DIMELER |
| 165,141 | 7-22-71 | 3,759,817 | 9-18-73 | Blend Comprising Hydrorefined Oil and Raw Distillate - IVOR W. MILLS & GLENN R. DIMELER |
| 175,775 | 8-27-71 | | | Blended Hydrocarbon Oil and Process of Manufacture IVOR W. MILLS & GLENN R. DIMELER |
| 200,185 | 11-18-71 | 3,791,959 | 2-12-74 | Blended Refrigeration Oil Composition - IVOR W. MILLS & GLENN R. DIMELER |
| 228,832 | 2-24-72 | 3,839,189 | 10-7-74 | Hydrorefined Lube Oil and Process of Manufacture - IVOR W. MILLS & GLENN R. DIMELER |
| 240,810 | 4-4-72 | 3,847,623 | 11-12-74 | Oil for Use in Printing Inks - IVOR W. MILLS, GLENN R. DIMELER, WILLIAM A. ATKINSON, JR. & JAMES P. HOFFMAN |

The disclosure of all of the above-referred to applications is hereby incorporated herein by reference, particularly as to disclosure therein directed to hydrorefined oils in the lube viscosity range, to uses of such oils, and to the production of such oils, and to conditions which are useful in solvent extraction of oils.

BACKGROUND OF THE INVENTION

Certain of the previously cited applications (e.g., see Ser. No. 165,141) involve the discovery that the performance in such tests, as ASTM D-943 and ASTM D-1313 can be greatly increased for a severely hydrorefined naphthenic distillate if such oils are admixed with raw (i.e., unhydrogenated) naphthenic distillate (preferably naphthenic distillate which is substantially free of naphthenic acids). U.S. Pat. No. 3,419,497, issued Dec. 31, 1968 to Rocchini et al., discloses similar blends. The unhydrogenated distillate can be a raffinate from extraction with an aromatic selective solvent (e.g., furfural, phenol, $SO_2$). Prior to blending, the unhydrogenated distillate can be subjected to non-sulfonating acid treatment (to remove basic nitrogen compounds) and/or can be contacted with an adsorbent (e.g., alumina, activated carbon, attapulgite, Super Filtrol or the mixtures of U.S. Pat. No. 3,369,993). Preferably, the 335 UVA of the hydrorefined oil component is less than 0.04. The blends can also contain, as a third component, from 0.1-30 wt. percent of a "cycle oil" (recycle from catalytic cracking of gas oil).

For purposes of the present invention, the term 335 UVA denotes 335 millimicrons ± one millimicron (or the 334-336 mM region). Similarly, 330 mM denotes 330 ± mM (or the 329-331 mM region). Unless otherwise specified viscosity ranges and measurements herein are at 100°F. and percentages are by weight.

The present invention involves our discovery that extraction (with an aromatic selective solvent) of such blends or hydrorefined and unhydrorefined oil (and which can also contain a cycle oil) can produce a raffinate oil of improved stability (as in the Doble oxidation test). That is, the invention includes preparing a petroleum oil of improved stability from a hydrogenated petroleum oil, by a process comprising blending from 25-98 parts by weight of the hydrogenated petroleum oil with from 75-2 parts of an unhydrogenated petroleum oil and then extracting the resulting blend with an aromatic selective solvent to obtain a raffinate product. The invention also includes novel oils prepared by this process.

SUMMARY OF THE INVENTION

A petroleum oil of improved stability (e.g., as an electrical insulation medium), can be prepared by a process comprising blending 25-98 parts (preferably 50-95) of a severely hydrorefined oil [preferably, a hydrorefined naphthenic or mildly aromatic oil having a VGC from 0.820-0.940, a viscosity from 30 to 200 SUS at 100°F. and an ultraviolet absorptivity (UVA of less than 0.04 in the 335 millimicron region (i.e., 335 UVA)] with from 75-2 parts (preferably 50-5) by weight of unhydrogenated distillate (preferably naphthenic distillate which, more preferably, is free of naphthenic acids, and more preferred, has a pour point less than 0°F.), and then extracting the blend with an aromatic selective solvent (e.g., furfural, phenol) to obtain a raffinate oil product. The raffinate can be finished, as by adsorbent contact with attapulgite, acid activated clay or mixtures of such adsorbents. From 0.1-30 weight percent of a cycle oil can be added to the blend before extraction or to the raffinate oil product. Preferably, the blended oil and the raffinate product contain less than 25 ppm of total nitrogen and less than 5 ppm (typically, less than 1 ppm) of basic nitrogen. The raffinate oils can be useful as electrical oils, textile oils, rubber process oils, refrigerator oils, and mist lubricants. The extract fraction can be used as a rubber process oil.

FURTHER DESCRIPTION

The preferred hydrogenated distillate is naphthenic (by VGC), has an ultraviolet absorptivity of less than 0.1 in the 330 millimicron region and is substantially free of naphthenic acids. More preferred the ultraviolet absorptivity of said hydrogenated distillate in the 335 millimicron region is less than 0.04. Preferably, the refined naphthenic distillate has an ultraviolet absorptivity at 260 millimicrons in the range of 0.05–2.0. Preferably, the hydrogenated petroleum oil has a viscosity-gravity constant (VGC) in the range of 0.78–0.94 (more preferred 0.840–0.899) and the unhydrogenated oil has a VGC in the range of 0.78–0.899 (more preferred 0.840–0.899).

The unhydrogenated oil can be selected from (a) a raffinate from solvent extraction of a naphthenic distillate; (b) naphthenic distillate; (c) naphthenic acid-free naphthenic distillate; (d) dewaxed paraffinic distillate; and, (e) mixtures of two or more members from (a), (b), (c) and/or (d) above.

The viscosity of the blend can be in the range of 30–8000 SUS at 100°F. (typically, 40–3000 SUS) and individual component oils can be of higher viscosity (e.g., up to 12,000 SUS at 100°F.). The ASTM viscosity index of the components can vary from below 0 (for some naphthenic oils) to above 100 (for paraffinic oils, including naphthenic oils which have been hydrocracked, as to a paraffinic VGC)

One utility of the products of the present invention is as an electrical insulation medium. The properties of commercial oils used as insulating media in transformers are well known in the art and a list of typical characteristics is given in the test by F. M. Clark entitled "Insulating Material for Design and Engineering Practice" (1962), page 135. Such oils typically boil in the range of 460°–775°F. and have viscosities in the range of 50 to 65 SUS (preferably 55 to 60 SUS) at 100°F., as may be seen by reference to Wasson et al., U.S. Pat. No. 3,000,807 and to Wynkoop and Bartlett, U.S. Pat. No. 3,406,111. There have also been reports of transformer oils having viscosities as low as 40 and as high as 200 SUS at 100°F. The viscosity-gravity constant (i.e., VGC) of the transformer oil can be in the range of 0.82 to 0.92, preferably at least 0.84. The oils of the Wynkoop and Bartlett patent are characterized by extremely low total nitrogen content and a very long sludge-free life under the Doble test conditions.

The oils of the present invention can have a total nitrogen content as high as 25 ppm but must have a basic nitrogen content less than 10 ppm (preferably, less than 5 ppm, typically less than 1 ppm). They typically have a sludge-free Doble life of less than 75 hours but have good stability under such test conditions as those of ASTM-D-1313 and D-943 and have a good impulse breakdown strength. The electrical oils typically have a VGC in the range of 0.820–0.899 (more preferred at least 0.85) and a viscosity at 100°F. in the range of 30–200 SUS (the lower viscosity being useful in arctic climates.

With some compounds, such as paraffinic distillates, dewaxing and/or deasphalting can be advantageous prior to blending (or hydrorefining). Preferably, to insure longer catalyst life and to reduce hydrogen consumption, when the petroleum fraction is derived from a stock containing naphthenic acids, such acids should be removed (or substantially reduced) prior to hydrorefining (or, for the unhydrorefined component, prior to blending). A preferred means of removing the naphthenic acid impurities from the distillate are shown, for example, in U.S. Pat. Nos. 1,603,174; 2,770,580; 2,795,532; 2,944,014; 2,966,456; and 3,080,312, and can involve conducting the distillation in the presence of a base, such as caustic.

A less preferred method is to remove the naphthenic acid impurity at a later stage in the refining process, such as by contacting with a basic clay in the final finishing or, in the case of hydrorefining, by converting the naphthenic acids to water and the corresponding naphthene (e.g., see "The Manufacture of Electrical Insulating Oils" by Jennings, H. C. and Lawley, J. R., paper presented to the Edison Electric Institute, Electrical System and Equipment Committees, Sept. 28, 1964, St. Louis, Missouri).

Conventional processes for decreasing the content of heterocyclic sulfur and nitrogen compounds in naphthenic distillate, to produce a transformer oil, involve interaction of such compounds with a reagent, such as hydrogen, which can cause them to decompose to $H_2S$ or $NH_3$ and the corresponding hydrocarbon, or involves interaction with a precipitant, such as an acid (e.g., $H_2SO_4$, HF, $BF_3$, etc.) or involve the use of an adsorbent such as attapulgite and/or an acid-activated clay, or an acidic, crystalline alumino-silicate zeolite adsorbent.

In such conventional processes for refining naphthenic distillate to produce a transformer oil, the process conditions are usually such that the removal of the sulfur- and nitrogen-containing impurities is not selective and the aromatic hydrocarbon content of the distillate is altered by the treatment. In the case of hydrorefining (particularly severe hydrorefining at pressures above about 800 psi. of hydrogen and temperatures above about 500°C., in the presence of catalysts containing cobalt, nickel, molybdenum, tungsten, ets.), the total gel aromatics (such as the tetracyclic and pentacyclic condensed aromatic rings) are altered to a greater extent than are the less highly condensed aromatic compounds, such as those aromatic compounds which are polynuclear and contain only one aromatic ring.

By naphthenic distillate, we refer to a distillate fraction (or a mildly acid treated distillate fraction, or a solvent raffinate fraction or an acid-treated raffinate) usually from vacuum distillation, or a crude which is classified as naphthenic (including "relatively naphthenic") by the viscosity-gravity constant (VGC) classification method. Preferably, such crudes are "Grade A" (wax-free), typically Gulf Coastal, and include, for example, Refugio, Mirando, and Black Bayou. The lower VGC oils can be obtained from mid-continental crudes; however, dewaxing may be necessary (as by extraction or isomerization) to insure, for 50–70 SUS transformer oils, that the final blended oil has a pour point of less than −50°F. Such fractions will have a VGC in the range of 0.820 to 0.899 and, usually a viscosity in the range of 30–200 SUS at 100°F. (typically, 40–70). In some cases the crude (and distillate) can have a VGC as high as 0.94 (such crudes are characterized as "mildly aromatic". Deep furfural extraction (e.g., about 50% yield) of a high VGC Grade A crude can be used to produce a wax-free, lower VGC fraction (e.g., 0.83 VGC) which can be used in low pour point blends. The paraffinic oils have a VGC of 0.819 or less.

In electrical oil applications, blends containing the preferred distillates (and raffinates) where one (or more) component has a viscosity in the range of 200–12,000 SUS at 100°F. can also be used where the viscosity contributions of all of the components are such that the final blend of hydrorefined and unhydrorefined oil is within the range of 30–200 SUS at 100°F. For products such as textile oils, rubber process oils, refrigerator oils, and mist lubricants, the final blend can have a viscosity at 100°F. as high as 1000 SUS, and can contain such components as hydrogenate olefin and/or a hydrocracked lube oil (preferably stabilized by furfural extraction), especially of 90+ VI. Such components are described, for example, in U.S. Pat. Nos. 3,595,796 and 2,960,458 and in applications Ser. No. 895,302; 78,191 and 90,073.

Regarding the hydrorefined component, the aforementioned patent application Ser. No. 652,026 discloses that in the production of transformer oils from a 40–70 SUS (at 100°F.) naphthenic distillate by hydrorefining, it is advantageous to choose conditions (e.g., 625°F., 1200 psig of 80% $H_2$) such that the sulfur and nitrogen contents of the distillate are substantially reduced and there is a concomitant partial saturation of polycyclic aromatic hydrocarbons such that the ultraviolet absorptivity of the hydrorefined product at 335 millimicrons (335 UVA) is below 0.04 (preferably below 0.01).

Such severe hydrorefining can be at a temperature in the range of 500° to 750°F. and from 800–3000 psi of hydrogen partial pressure at a liquid hourly space velocity of from 0.1–8.0, preferably conducted wither in vapor phase or trickle phase. Product recycle, for example as in U.S. Pat. No. 2,900,433, can be used, preferably as a product to fresh feed ratio below 10:1 (more preferably 8:1 to 1:1). Preferably the temperature is below that at which substantial cracking occurs; that is, no more than 20% (preferably less than 10%) of the feed stock is converted to material boiling below 300°F.

Although the maximum hydrorefining temperature which will not produce substantial cracking is somewhat dependent upon the space velocity, the type of catalyst and the pressure, generally it is below 750°F. For severe hydrorefining under nonaromatization conditions, we prefer to operate below 700°F., more preferably below 675°F. At total pressures below 2000 psig and with a fairly fresh catalyst, we prefer a temperature no greater than 650°F. since above that temperature aromatization can occur and/or the production of low boiling material and the degradation of oil viscosity can become substantial. After some months of use, if the activity of the catalyst decreases appreciably, a lower space rate and/or higher temperature (c.a. 675°F.) can be used to prolong catalyst life, i.e., to delay regeneration or replacement of the catalyst. FIG. 2 is representative of results which can be obtained during the majority of the catalyst life with HDS-3A catalyst.

Typical of such severe hydrorefining methods, which can be used in our process when conducted within the processing conditions referred to herein, are those of U.S. Pat. Nos. 2,968,614; 2,993,855; 3,012,963; 3,114,701; 3,144,404 and 3,278,420. It is usual to strip $H_2S$ from the product and "top" it (by removing low boiling products, as by steam stripping) to a desired flash point and/or viscosity. When such products have a viscosity in the range of 30–40 SUS, they can be useful as base oil, or base oil components, for use in transformers, in Arctic regions (e.g., the "North Slope") or in refrigerated cables. Such oils can contain an oxidation inhibitor, (e.g., DBPC). They are preferably, finally finished by water removal (brightening) as by means of a filter press.

Typical catalysts are molybdenum oxide, cobalt-molybdenum oxides, nickel-molybdenum oxides, cobalt-nickel molybdenum oxides and tungsten-nickel molybdenum oxides, preferably pre-sulfided and on a carrier such as silica, alumina, alumina-titania and alumino-silicates (either crystalline or amorphous). Nickel sulfide, nickel-molybdenum sulfide, tungsten disulfide, nickel-tungsten sulfide and molybdenum disulfide, per se or on a carrier, can also be used as catalysts. Examples of operable catalysts are those of U.S. Pat. Nos. 2,744,052; 2,758,957; 3,053,760; 3,182,016; 3,205,165; 3,227,646 and 3,264,211. A preferred catalyst will permit production of a 100 SUS at 100°F. oil having a 260 UVA of 2.5 or less at about 1000 psi $H_2$, 600°F. and 0.5 LHSV.

We prefer that such severe hydrorefining (when under conditions favoring hydrogenation) by a trickle-phase process (although gas-phase operation with hydrogen recycle up to 12,000 SCF/B can be utilized) at 525°–675°F. and 800 to 1600 psi of hydrogen partial pressure using a catalyst comprising nickel and molybdenum sulfides on alumina or silica. Usually a cobalt-molybdenum catalyst will require 25 to 100 percent greater hydrogen pressure, at a given temperature, recycle and LHSV, to produce a severely hydrorefined transformer oil comparable to that obtained with a sulfided nickle-molybdenum catalyst.

As has been noted in U.S. Pat. No. 2,973,315, the severity of hydrogenation can be measured by the hydrogen consumption. With a 40 to 200 SUS (more usually 45 to 70 SUS) naphthenic distillate feed, reaction severity can also be followed by observing the change in ultraviolet absorptivity, as in the 260 millimicron region (hereinafter sometimes the 260 UVA). For transformer oil manufacture according to the present invention, the change in absorptivity in the 335 millimicron region (335 UVA) should be observed. That is, due to hydrogenation of polycyclic aromatic hydrocarbons, the resulting hydrogenated oil will have lower (e.g., at least 40%) ultraviolet absorptivity in the 335 millimicron region (and in the 260 mM region) than will the base oil before hydrogenation. FIG. 2 illustrates the effect of hydrorefining severity on 335 UVA.

Typically, after severe hydrogenation (under non-aromatizing conditions), the 260 mM absorptivity of the naphthenic distillate is reduced by from 40 to 90% and is less than 5.0 for a 40 to 100 SUs naphthenic distillate feed (more commonly less than 3.5). Preferably, in the 40 to 70 SUS range, the hydrogenated oil will have a 260 UVA less than 2.0, will contain less than 0.1% sulfur and less than 25 ppm of total nitrogen (and less than 5 ppm of basic nitrogen).

Due to differences in aromatic, sulfur and nitrogen content of the base oils, hydrogen consumption can vary greatly; however, hydrogen consumption for severe hydrorefining of a naphthenic acid-free distillate is usually at least 150 SCF/bbl. For an indication of the large hydrogen consumption in severe hydrorefining (under non-aromatizing conditions) see U.S. Pat. No. 2,973,315 and the aforementioned U.S. Pat. application Ser. No. 622,398. One cause of high hydrogen consumption is that we prefer to hydrorefine at conditions (e.g., 575°–650°F., 900 to 1500 psi of $H_2$, total pressure 800 to 3000 psig, no gas recycle, sulfided Ni-Mo catalyst) such that the total gel aromatics in the feed to the hydrorefining step are reduced by about 5 to 25% (mainly due to removal of polar compounds) and most (55 to 90%) of the dicyclic and higher aromatics in the feed are converted to monocyclic aromatics. In particular, under such conditions, the 335 UVA of the resulting severely hydrorefined naphthenic distillate will be less than 0.04.

In contrast, mild hydrogenation processes frequently consume less than 150 SCF of $H_2$/bbl. and are characterized by little change in polycyclic aromatic content of the oil (in particular, the 335 UVA after hydrotreating is greater than 0.04 for 40 to 70 SUS naphthenic feed). Mild hydrogenation is frequently termed "hydrotreating" and is usually conducted below 800 psi of hydrogen or below 500°F. Typical of mild hydrogenation treatments are U.S. Pat. Nos. 2,865,849; 2,921,025; 2,944,015 and 3,011,972.

Severe hydrorefining, as defined herein, is distinguished from hydrocracking in that no more than 20% (typically less than 15%) of a product need be removed (e.g., by topping) to obtain a hydrorefined oil of the same viscosity as the charge stock.

In the solvent extraction step, any of the well known selective solvents for aromatics can be employed, e.g., furfural, phenol, sulfur dioxide, nitrobenzene, B,B'-dichloroethyl ether, etc. Temperatures of 100° to 250°F. and solvent-to-oil ratios of 1–4:1 are preferred. Extract yield is usually 10 to 25 weight percent of charge. Other conditions and yields are contemplated in some cases. For example, it is sometimes advantageous to use the "cold" extraction disclosed in U.S. Pat. No. 3,514,395, issued May 26, 1970, to McVay et al. In such an extraction the temperature can be as low as 60°F., and the solvent dosage can be in the range of 50–300%. Broadly, the extraction step of the present invention can be at a temperature in the range of 60°–250°F. at a solvent to oil volume ratio in the range of 0.5 to 1 to 4 to 1. The extract product from such extractions is especially valuable as a rubber extender oil or rubber process oil.

The most important factor in the extraction step is the yield of raffinate product. For a satisfactory transformer oil this yield should, generally, be in the range of 70–95 volume %, more preferred 75–90% (typically, about 80%).

ILLUSTRATIVE EXAMPLES

In the following examples, Example I illustrates the severe hydrorefining of a naphthenic acid free, naphthenic distillate to produce a severely hydrorefined transformer oil having a 335 UVA less than 0.04. This hydrogenated naphthenic distillate can be used as the hydrorefined oil component of blends which are solvent extracted in the present invention.

Example II shows making a blend of hydrorefined and unhydrorefined oil and extracting the blend to produce a raffinate. Also shown is clay finishing of the raffinate.

Example III (combined with Example II) shows that the choice of type of adsorbent in the finishing step can alter the properties of the final oil.

Example IV shows the effect of altering the solvent to oil ratio in the extraction step.

Example V shows the properties of a blend which was clay finished but not extracted.

Example VI (by Tables II, III and IV) shows the effect of many process variables and indicates that the process of the present invention is flexible and can produce many varied products.

EXAMPLE I

A naphthenic acid free, naphthenic distillate having a 5% point of 564°F. and a 95% point of 660°F. was contacted with a catalyst prepared by sulfiding a composite of nickel and molybdenum oxides on alumina. The hydrorefining conditions included 0.5 feed LHSV, 4.0 recycle LHSV, 1200 psig of 80% $H_2$ and a hydrorefining temperature of 625°F. After contacting with 10 lbs./barrel of attapulgite, the resulting severely refined transformer oil had a sludge-free Doble life of less than 48 hours. Typical properties of the feed and product of Example I are shown in Table I hereof along with corresponding properties of two "conventional" transformer oils.

EXAMPLE II 5 volumes of unhydrorefined naphthenic distillate (the Example I feed) were blended with 95 volumes of the hydrorefined naphthenic oil (the Example I product). This blend was contacted (in a separatory funnel) with furfural at 170°F. at a solvent to oil volume ratio of 2:1, for about 20 minutes, allowed to cool to 160°F. for 5 minutes and the phases were separated at that temperature to recover a raffinate product in 79.6% yield. After contacting with 10 lb./bbl. of attapulgite clay the clay-finished raffinate product had a sludge-free Doble life of at least 48 hours but less than 56 hours. After 56 hours of Doble testing sludge was observed. TAG acid number after 72 hours of Doble testing was 0.15.

EXAMPLE III

Example II was repeated except that the raffinate was contacted with 10 lb./bbl. of acid-activated clay (Super Filtrol). The clay finished raffinate had a sludge-free Doble life of at least 24 hours but less than 48 hours (acid No. 0.12) and contained 16.4 wt.% aromatics (refractive index 1.4820).

EXAMPLE IV

Example 2 was repeated except that the solvent to oil ratio was 0.6 to 1 and the raffinate yield was 88.7%. The clay-contacted raffinate product contained 22.9 wt. % aromatics (refractive index of 1.4872) and the sludge free Doble life was over 24 and less than 48 hours.

EXAMPLE V

Example 2 was repeated except that the blend was not extracted. That is, the blend was contacted with 10 lb./bbl. of attapulgite to produce a clay-finished blend. The clay-finished blend (refractive index 1.4894) had a sludge-free Doble life of more than 24 hours and less than 48 hours. The TAG acid number after 72 hours of Doble testing was 0.20.

EXAMPLE VI

Although impulse break-down strength was not measured on the oils of the previous examples, it is believed that the clay-contacted raffinates produced by the present process have an improved impulse break-down strength. This conclusion is based on data obtained by contacting hydrorefined naphthenic distillate with furfural, followed by clay-finishing. For example, the hydrorefined oil (prior to clay contacting) of Example I was extracted with furfural under the conditions in Example II and the raffinate product (84.5% volume yield) was contacted with 10 lb./bbl. of attapulgite. The average (of 5 tests) impulse break-down strength was 222. The clay-contacted raffinate contained 16.2% aromatics (1.4816 refractive index) and had a 260 UVA of 0.555; a 325 UVA of 0.029 and 335 UVA Of 0.010. The addition of 0.3% of DBPC reduced the average impulse break-down strength to 198. Extraction of the hydrorefined oil at a solvent to oil ratio of 5 to 1, followed by 10 lb./bbl. attapulgite, produced a clay-finished raffinate containing 7.9 wt.% aromatics (refractive index 1.4760) and 260 UVA of 0.502; 325 UVA 0.030 and 335 UVA 0.008.

EXAMPLE VII

A blend was made of 90 volumes of the hydrogenated naphthenic oil of Example 1 and 10 volumes of the unhydrogenated ("raw") naphthenic oil. Samples of this blend were extracted with furfural and subjected to various other treatments. The results are summarized in the attached Table II. The attached Tables III and IV contain similar data for blends containing other proportions of hydrorefined and unhydrorefined oil In the tables, "% Raff." is the volume % yield of raffinate; "Atta" is attapulgite clay; "SF" is Super Filtrol clay; and "TAN" is the TAG acid number after the indicated number of hours of testing. The plus (+) sign indicates that sludge was observed after the indicated number of hours of the Doble test (e.g., +24 that sludge was observed after 24 hours of testing).

The most important factor in the extraction step is the yield of raffinate product. For a satisfactory transformer oil this yield should, generally, be in the range of 70–95 volume %, more preferred 75–90% (typically, about 80%).

An alternate, less preferred method of making electrical and other specialty oils is to extract (with an aromatic selective solvent) a hydrorefined oil and then to add, to the raffinate product, in the range of 2–40 wt. % of an unhydrorefined oil (such as a naphthenic acid-free naphthenic distillate or a raffinate from solvent extraction of such a distillate).

The accompanying Table V shows an excellent transformer oil made by the present process, by extraction (85% yield) of a blend of 90% hydrorefined and 10% unhydrorefined oil, followed by contact with Super Filtrol ("S.F."), to which 0.5% of a cycle oil was added to further improve the sludge-free Doble life.

Table VI shows typical boiling range and UVA data for such a cycle oil additive.

Table VII shows the excellent inhibitor response (i.e., for 0.02% DBPC) which can be found in transformer oils made by the process of the present invention.

Apart from raffinate yield, another important factor (especially for transformer oils) is the 335 UVA of the raffinate. The 335 UVA of the raffinate can vary, at a given yield, depending on type of solvent, temperature and solvent to oil ratio.

The term "sludge-free Doble life" refers to an oil which, after the indicated number of test hours under Doble test conditions, has no visible sludge and less than the maximum prescribed power factor at any given time during the test. This requires that the acid (or neutralization) number be no greater than 0.25 mg.KOH/g.

The term "naphthenic acid free naphthenic distillate" refers to a naphthenic oil having a TAN (total acid number) less than 0.2 (more preferred, less than 0.1, typically less than 0.05).

TABLE I

| | Properties of Transformer Oils | | | |
| --- | --- | --- | --- | --- |
| | Example 1 Feed | Example 1 Product | Conventional Transformer* | Conventional Transformer** |
| Viscosity, SUS/100°F | 57.2 | 57.5 | 57.3 | 57.2 |
| Gravity, API° | 25.1 | 26.5 | 25.7 | 25.9 |
| Total Nitrogen, ppm | 74 | 20 | 10 | 5 |
| Total Sulfur, Wt. % | 0.17 | 0.04 | 0.15 | 0.05 |
| Aromatics, Wt. % | 40 | 25.5 | 35 | 32 |
| Performance | | | | |
| Oxidation ASTM D-943, Hours, Uninhibited | 80 | 13 | 90 | 90 |
| Oxidation ASTM D-1313, % Sludge (GE Bomb) | 0.14 | 76 | 0.07 | 0.06 |
| Impulse Breakdown Strength, (KV) | — | 170+ | — | 152 |
| 335 UVA | 0.09 | 0.015 | 0.045 | 0.019 |
| 325 UVA | 0.38 | 0.05 | 0.25 | 0.17 |
| 260 UVA | 5.1 | 1.2 | 3.5 | 2.5 |

*10 lb/bbl of 99% $H_2SO_4$ of acid-free naphthenic distillate
**35 lb/bbl of 99% $H_2SO_4$ treatment of furfural raffinate of acid-free naphthenic distillate

TABLE II

| Base Oil | Furfural % Raff. | Treatment Sequence 99% $H_2SO_4$ (lbs/bbl) | Clay, lbs/bbl Atta | SF | Sludge | Doble Test, PFVO Curve | Tan |
| --- | --- | --- | --- | --- | --- | --- | --- |
| A* | — | — | — | — | +24 (Hvy) | Fail at 43 hrs. | — |
| B* | — | — | 15 | — | +24 (Slt) | Pass (Good) | 0.58 at 48 hrs. |
| C** | — | — | 10 | — | −24, +48 (Hvy) | Pass (Excellent) | 0.15 at 70 hrs. |
| D** | — | 5 | 15 | — | −24, +48 (Hvy) | Pass (Excellent) | 0.32 at 72 hrs. |
| E** | 97 | — | — | 10 | −24, +48 (Hvy) | Pass (Excellent) | 0.15 at 70 hrs. |
| F** | 97 | — | 10 | — | −24, +48 (Hvy) | Pass (Excellent) | 0.15 at 70 hrs. |
| G** | 92 | — | — | 10 | −24, +48 (Hvy) | Pass (Excellent) | 0.15 at 72 hrs. |
| H** | 92 | — | 10 | — | −24, +48 (Hvy) | Pass (Excellent) | .12 at 74 hrs. |
| I** | 85 | — | — | 10 | −56, +72 (Slt) | Pass (V.G.) | 0.15 at 96 hrs. |
| J** | 85 | — | — | 10 | −56, +72 (Hvy) | Pass (Excellent) | |
| K** | 85 | — | — | 10 | −48, +64 (Hvy) | Pass (Excellent) | |
| L** | 85 | — | 10 | — | −56, +72 (Slt) | Pass (V.G.) | 0.15 at 96 hrs. |
| M** | 85 | — | 10 | — | −56, +72 (Hvy) | Pass (Excellent) | |

TABLE II-continued

| Base Oil | Furfural % Raff. | Treatment Sequence 99% H₂SO₄ (lbs/bbl) | Clay, lbs/bbl Atta | SF | Sludge | Doble Test, PFVO Curve | Tan |
|---|---|---|---|---|---|---|---|
| N** | 85 | — | 10 | — | −48, +64 (Hvy) | Pass (Excellent) | |

*Hydrorefined
**90% hydrorefined, 10% unhydrorefined

TABLE III

| Base Oil | Furfural % Raff. | Treatment Sequence 99% H₂SO₄ (lbs/bbl) | Clay, lbs/bbl Atta | SF | Sludge | Doble Test, PFVO Curve | TAN |
|---|---|---|---|---|---|---|---|
| A*** | — | — | — | — | +24 (Slt) | Fail at 36 hrs. | |
| B*** | — | — | — | 10 | +24 (Slt) | Fail at 34 hrs. | |
| C*** | — | — | 10 | — | +24 (Slt) | Fail at 39 hrs. | — |
| D*** | 88 | — | 10 | — | +24 (Slt) | Fail at 48 hrs. | — |
| E*** | 88 | — | — | 10 | +24 (Slt) | Fail at 50 hrs. | — |
| F*** | 77 | — | 10 | — | −48, +56 | Pass (Fair) | — |
| G*** | 77 | — | — | 10 | −48, +56 | Pass (Fair) | — |
| H*** | 69 | — | — | 10 | −56, +72 (Slt) | Pass (Excellent) | — |
| I*** | 69 | — | — | 10 | −48, +64 (Hvy) | Pass (Good) | — |
| J*** | 69 | — | 10 | — | −48, +56 | Pass (Good) | — |
| K*** | — | 15 | 15 | — | +48 | Pass (Excellent) | — |

***75% hydrorefined oil and 25% unhydrorefined

TABLE IV

| Base Oil | Furfural % Raff. | Treatment Sequence 99% H₂SO₄ (lbs/bbl) | Clay, lbs/bbl Atta | SF | Sludge | Doble Test, PFVO Curve | TAN |
|---|---|---|---|---|---|---|---|
| A**** | — | — | 10 | — | +24 | Fail at 25 hrs. | — |
| B**** | — | 15 | 15 | — | −64, +72 (Slt) | Pass (Excellent) | 0.12 at 96 hrs. |
| C**** | 90 | — | — | 10 | +24 | Fail at 31 hrs. | |
| D**** | 90 | — | 10 | — | +24 | Fail at 27 hrs. | |
| E**** | 75 | — | — | 10 | −24, +48 | Fail at 40 hrs. | |
| F**** | 75 | — | 10 | — | −24, +48 | Fail at 46 hrs. | |
| G**** | 67 | — | — | 10 | −48, +56 (Hvy) | Pass (Good) | 0.21 at 80 hrs. |
| H**** | 67 | — | 10 | — | −48, +56 (Hvy) | Pass (Fair) | 0.18 at 80 hrs. |

****50% hydrorefined oil and 50% unhydrorefined

TABLE V

Processes for Making Transformer Oils from Hydrogenated Naphthenic Distillate

| Base Oil | 260 UVA Hydro-transil | Treatment | Additive | ASTM D-943 Hours | Sludge Hours | Doble Test Curve | TAN |
|---|---|---|---|---|---|---|---|
| 80% hydro-transil 20% transil | 1.3 | Atta. at 10 lbs/bbl acid-activated clay | none | 356 TAN | −24, +32 | OK | 0 at 56 hrs. |
| 80% hydro-transil 20% transil | 1.3 | 93% H₂SO₄ at 2 lbs/bbl attapulgite | none | 420 TAN | −32, +48 | OK | 0.18 at 72 hrs. |
| 92.5% hydro-transil 6.9% transil 0.6% cycle oil | 1.3 | Atta. at 10 lbs/bbl S.F. at 10 lbs/bbl before add'n of cycle oil | cycle oil | 188 TAN | −32, +48 | OK | 0.06 at 72 hrs. |
| 92.5% hydro-transil 6.9% transil 0.6% aromatic conc. | 1.3 | Atta. Clay at 10 lbs/bbl S.F. at 10 lbs/bbl before add'n of aromatic concentrate | aromatic conc. | 168 TAN | −34, +48 | OK | 0 at 72 hrs. |
| 90% hydro-transil 10% transil raffinate | 1.0 | Add 0.03% DBPC after contacting with 10 lbs/bbl attapulgite | DBPC | 324 IFT* | −64, +72 | OK | 0 at 96 hrs. |
| 90% hydro-transil 10% transil | 1.0 | S.F. 10 lbs/bbl before adding 0.5% cycle oil | cycle oil | N.M. | −64, +72 | OK | 0.03 at 96 hrs. |
| 90% hydro-transil 10% transil | 1.0 | 85% raffinate with furfural 10 lbs/bbl S.F. add 0.5% cycle oil | cycle oil | N.M. | −64, +72 | OK | 0 at 72 hrs. |
| 75% hydro-transil 25% transil | 1.0 | 69% raffinate with furfural 10 lbs/bbl acid activated clay | none | N.M. | −64, +72 | OK | 0.12 at 72 hrs. |
| hydro-transil | 1.0 | 15 lbs/bbl attapulgite+0.02%DBPC | DBPC | N.M. | −56, +72 | OK | 0 at 96 hrs. |
| hydro-transil | 1.0 | 15 lbs/bbl attapulgite | none | 75 TAN | +24 | Fail | |

N.M. - not measured
Transil is a naphthenic distillate having an SUS viscosity at 100°F
Hydro-transil is severly hydrorefined transil having an SUS viscosity at 100°F
Transil raffinate is an 85% raffinate of transil.
"260 UVA Hydrotransil" is the ultraviolet of the hydrogenated transil component.
"Aromatic conc." is a distillate fraction of a cycle oil.
*TAN not measured, usually TAN end point(0.25 mg KOH/g) is reached before IFT end point of 15 dynes/cm.

TABLE VI

Boiling Range and Absorptivities of Recycle Oil from Catalytic Cracking of 450-700°F. Gas Oil

| % Distilled | Temp. °F. at 760 mm | Absorptivities at 260 m | at 325 m | at 335 m |
|---|---|---|---|---|
| Initial | 372 ) | | | |
| 10 | 601 ) | 19.9 | 1.0 | 0.4 |
| 20 | 616 ) | | | |
| 30 | 649 ) | 45.2 | 2.2 | 1.9 |
| 40 | 679 ) | | | |
| 50 | 706 ) | 98.6 | 5.7 | 6.8 |
| 60 | 712 ) | | | |
| 70 | 744 ) | 118.0 | 15.5 | 16.4 |
| 80 | 794 ) | | | |

TABLE VII

Solvent Extraction in Transformer Oil Manufacture

| Oil No. | Base Oil | Treatment | Inhibitor | Doble, Hours | Oxidation Tests D943, Hours | D1313, Sludge |
|---|---|---|---|---|---|---|
| 1 | 90% 60N 10% 60G | 85% Raf (furfural) 10 lbs./bbl Clay (SF) | 0 | −48, (−56), +64 | 118 | 0.064 Wt. % |
| 2 | 90% 60N 10% 60G | 85% Raff (furfural) | 0.02% DBPC* | −64, (−72) | | |
| 3 | 90% 60N 10% 60G | 85% Raff (furfural) | 0.5% cycle oil | −72 (one experiment) | | |
| 4 | 90% 60N 10% HT Raff | 0 or 10 lbs./bbl or atta | 0 | +48 | | |
| 5 | 90% 60N 10% HT Raff | None | 0.02% DBPC | −64, (−72) | 130 | |
| 6 | 90% 60N 10% HT Raff | 0 or 10 lbs./bbl SF or Atta | 0.5% cycle oil | | | |
| 7 | 75% 60N 25% 60G | 69% Raff (furfural) 10 lbs/bbl SF | 0.01 | +80 | | |

"60N" is hydrorefined naphthenic distillate having viscosity at 100°F. of 60 SUS.
"60G" is the "raw" distillate which is hydrogenated to make the "60N".
"HT Raff" is a raffinate (85% yield) from furfural extraction (160°F. separation temperature at 150 volume percent furfural dosage based on feed) of the "60G".
"85% Raff (furfural)" indicates the raffinate product of a furfural extraction of the "base oil" at the conditions noted above for "HT Raff".
"DBPC" is dibutylparacresol inhibitor. A minus sign (−) indicates no sludge at the noted time in the Doble test.
"SF" indicates a final finishing by contacting with Super Filtrol (an acid-activated clay).
"Atta" indicates a final finishing by contacting with attapulgite, a fuller's earth bleaching clay.
Oil No. 1 contained 16.6 wt. % aromatics.

The invention claimed is:

1. A composition containing in the range of 0.01 to 2 weight percent of a phenolic oxidation inhibitor and a petroleum oil of improved stability, said petroleum oil having been obtained by a process comprising blending from 40–95 parts by weight of a hydrogenated naphthenic distillate oil having a viscosity-gravity constant in the range of 0.78–0.94, an ultraviolet absorptivity of less than 0.1 in the 330 millimicron region, and less than 0.04 in the 335 millimicron region, with from 60–5 parts of an unhydrogenated and unhydrorefined petroleum oil having a viscosity gravity constant in the range of 0.78–0.899 and then extracting said blend with an aromatic selective solvent to obtain a raffinate product, and wherein said naphthenic distillate is substantially free of naphthenic acids.

2. A composition containing in the range of 0.01 to 2 weight percent of a phenolic oxidation inhibitor and a petroleum oil of improved stability, said petroleum oil having been obtained by a process comprising blending from 25–98 parts by weight of a hydrogenated petroleum oil having a viscosity-gravity constant in the range of 0.78–0.94, an ultraviolet absorptivity of less than 0.1 in the 330 millimicron region and of less than 0.04 in the 335 millimicron region with from 75–2 parts of an unhydrogenated and unhydrorefined petroleum oil having a viscosity-gravity constant in the range of 0.78–0.899 and then extracting said blend with an aromatic selective solvent to obtain a raffinate product, and wherein the blend contains as an additional component from 0.1–30 weight percent of a catalytically cracked cycle oil.

3. A composition according to claim 1 wherein said unhydrorefined naphthenic distillate has an ultraviolet absorptivity at 260 millimicrons in the range of 1.0–6.0.

4. A composition according to claim 3 wherein said unhydrorefined naphthenic distillate has an ultraviolet absorptivity at 330 millimicrons in the range of 0.05–2.0.

5. The composition of claim 1 wherein said inhibitor is 2,6-di-tertiary butyl-p-cresol.

6. The composition of claim 1 wherein said extraction produces a yield of said raffinate product in the range of 70–95 volume percent.

7. The composition of claim 1 wherein said raffinate has a greater impulse dielectric than said blend.

8. The composition of claim 1 wherein said raffinate has a better inhibitor response than said blend.

9. The composition of claim 1 wherein said raffinate has a better sludge-free Doble life.

10. The composition of claim 1 wherein the product of said process has a viscosity in the range of 30–40 SUS at 100°F. and is useful as a transformer oil.

11. A hydrogenated naphthenic oil having a viscosity at 100°F. in the range of 30–40 SUS and containing an effective amount of an oxidation inhibitor, and which is useful as a transformer oil for arctic regions, wherein a component of said oil was obtained by a process comprising hydrorefining a naphthenic distillate having a viscosity greater than 50 SUS at 100°F. to produce a hydrorefined oil having a 335 UVA less than 0.04, 330 UVA Less than 0.1 and a lower boiling range than said distillate, and distilling said hydrorefined oil to produce, as a fraction, said component having a viscosity at 100°F. in the range of 30–40 SUS.

12. The composition of claim 11 wherein said oxidation inhibitor is phenolic.

13. A transformer oil according to claim 1 and having an impulse dielectric strength of at least 200 KV, said oil being prepared by solvent extraction of a severely hydrorefined naphthenic oil having a 335 UVA less than 0.04.

14. The composition of claim 11 wherein said effective amount is in the range of 0.01 to 2 weight percent.

15. The composition of claim 12 wherein said effective amount is in the range of 0.01 to 2 weight percent and wherein said inhibitor is 2,6-ditertiary butyl-p-cresol.

* * * * *